US012273809B2

(12) United States Patent
Wang

(10) Patent No.: US 12,273,809 B2
(45) Date of Patent: Apr. 8, 2025

(54) WIFI HOTSPOT MANAGEMENT METHOD, ELECTRONIC DEVICE, AND STORAGE MEDIUM

(71) Applicant: ZTE CORPORATION, Shenzhen (CN)

(72) Inventor: Cheng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 378 days.

(21) Appl. No.: 17/759,747

(22) PCT Filed: Apr. 19, 2021

(86) PCT No.: PCT/CN2021/088103
§ 371 (c)(1),
(2) Date: Jul. 29, 2022

(87) PCT Pub. No.: WO2021/213320
PCT Pub. Date: Oct. 28, 2021

(65) Prior Publication Data
US 2023/0066379 A1    Mar. 2, 2023

(30) Foreign Application Priority Data

Apr. 20, 2020    (CN) .......................... 202010313024.8

(51) Int. Cl.
*H04W 84/12*    (2009.01)
*H04W 48/16*    (2009.01)
(Continued)

(52) U.S. Cl.
CPC .......... *H04W 48/16* (2013.01); *H04W 48/20* (2013.01); *H04W 76/10* (2018.02); *H04W 60/00* (2013.01)

(58) Field of Classification Search
CPC ..... H04W 48/16; H04W 76/10; H04W 48/20; H04W 60/00
(Continued)

(56) References Cited

U.S. PATENT DOCUMENTS 10,945,266 B2 *   3/2021   Gupta et al. ........... G06Q 50/01
11,252,689 B2 *   2/2022   Oduwaiye et al. ... H04W 72/04
(Continued)

FOREIGN PATENT DOCUMENTS

CN          104184668 A       12/2014
CN          105472676 A        4/2016
(Continued)

OTHER PUBLICATIONS

International Searching Authority. International Search Report and Written Opinion for PCT Application No. PCT/CN2021/088103 and English translation, mailed Jul. 7, 2021, pp. 1-13.
(Continued)

*Primary Examiner* — Christopher M Crutchfield
*Assistant Examiner* — Syed Ahmed
(74) *Attorney, Agent, or Firm* — Vivacqua Crane, PLLC

(57) ABSTRACT

Disclosed are a WiFi hotspot management method, an electronic device, and a storage medium. The WiFi hotspot management method may include: taking a connectable network resource of a current network environment as an initial network resource, and obtaining network information of the initial network resource; sending a hotspot enabling command to an external device, the hotspot enabling command carrying the network information of the initial network resource; receiving a feedback message in response to the hotspot enabling command from the external device, and connecting to a target WiFi hotspot enabled on the external device according to the feedback message, a frequency band of the target WiFi hotspot being staggered from a frequency (Continued)

band of the initial network resource; and utilizing the initial network resource and the target WiFi hotspot to transmit data.

11 Claims, 7 Drawing Sheets

(51) Int. Cl.
  *H04W 48/20* (2009.01)
  *H04W 76/10* (2018.01)
  *H04W 60/00* (2009.01)
(58) Field of Classification Search
  USPC .......................................................... 370/328
  See application file for complete search history.

(56) References Cited

U.S. PATENT DOCUMENTS

| | | | |
|---|---|---|---|
| 2006/0268767 A1* | 11/2006 | Sato et al. | |
| 2014/0080534 A1 | 3/2014 | Farhadi et al. | |
| 2016/0087775 A1 | 3/2016 | Hedayat | |
| 2017/0265241 A1 | 9/2017 | Fujishiro et al. | |
| 2020/0092763 A1 | 3/2020 | Yerramalli et al. | |
| 2020/0145923 A1* | 5/2020 | Park et al. | ........ H04W 52/0229 |

FOREIGN PATENT DOCUMENTS

| | | | | |
|---|---|---|---|---|
| CN | 106162665 | A | | 11/2016 |
| CN | 107770842 | A | | 3/2018 |
| CN | 108184245 | A | | 6/2018 |
| CN | 108770068 | A | | 11/2018 |
| CN | 109756916 | A | | 5/2019 |
| CN | 110996325 | A | * | 4/2020 ............ H04W 16/04 |
| EP | 3226631 | A1 | | 10/2017 |
| EP | 3668220 | A1 | | 6/2020 |
| JP | 2016531457 | A | | 10/2016 |
| WO | 2015050646 | A1 | | 4/2015 |
| WO | 2016084865 | A1 | | 6/2016 |
| WO | 2019031490 | A1 | | 2/2019 |

OTHER PUBLICATIONS

Industrial Property Cooperation Center (IPCC). Search Report for JP Application No. 2022-546707 and English translation, mailed Jun. 20, 2023, pp. 1-19.

Japan Patent Office. Notice of Reasons for Refusal for JP Application No. 2022-546707 and English translation, mailed Jul. 3, 2023, pp. 1-14.

The State Intellectual Property Office of People's Republic of China. Office Action for CN Application No. 202010313024.8 and English translation, mailed Aug. 2, 2024, pp. 1-22.

* cited by examiner

WIFI HOTSPOT MANAGEMENT METHOD, ELECTRONIC DEVICE, AND STORAGE MEDIUM

CROSS-REFERENCE TO RELATED APPLICATIONS

This application is a national stage filing under 35 U.S.C. § 371 of international application number PCT/CN2021/088103, filed Apr. 19, 2021, which claims priority to Chinese patent application No. 202010313024.8, filed Apr. 20, 2020. The contents of these applications are incorporated herein by reference in their entirety.

TECHNICAL FIELD

Embodiments of the present application relate to the field of communication, and more particularly, to a WiFi hotspot management method, an electronic device, and a storage medium.

BACKGROUND

At present, all mobile phones of the mainstream brands on the market support a multi-link data concurrent transmission acceleration function, which means that data are distributed into multiple links for transmission. In an actual application scenario, when a user enables the multi-link data concurrent transmission acceleration function, a mobile phone can simultaneously transmit data through a Cellular wireless network and an accessed WiFi hotspot, or simultaneously transmit data through two accessed WiFi hotspots. The multi-link data concurrent transmission acceleration function can add up data bandwidth rates of multiple links, greatly increasing the data transmission rate. Therefore, this function is being rapidly popularized and supported by products of the entire mobile phone industry.

However, the inventor found that when a mobile phone distributes data into multiple links for transmission, both uplink data and downlink data exist in each link, different wireless modules of the mobile phone simultaneously receive and transmit data in similar frequency bands or an identical frequency band, leading to mutual interference between the data transmitted by all the wireless modules, which increases the error rate of data transmission and decreases the rate of data transmission.

SUMMARY

According to embodiments of the present application, a WiFi hotspot management method, an electronic device and a storage medium are provided, so as to decrease the error rate of data transmission and increase the rate of data transmission when data are distributed into multiple links for transmission.

In order to solve the aforementioned technical problems, an embodiment of the present disclosure provides a WiFi hotspot management method. The method may include: taking a connectable network resource of a current network environment as an initial network resource and obtaining network information of the initial network resource; sending a hotspot enabling command to an external device, the hotspot enabling command carrying the network information of the initial network resource; receiving a feedback message in response to the hotspot enabling command from the external device, and connecting to a target WiFi hotspot enabled on the external device according to the feedback message, a frequency band of the target WiFi hotspot being staggered from a frequency band of the initial network resource; and utilizing the initial network resource and the target WiFi hotspot to transmit data.

An embodiment of the present application further provides a WiFi hotspot management method. The method may include: receiving a hotspot enabling command sent by a device requesting access, the hotspot enabling command carrying network information of an initial network resource accessed by the device requesting access; enabling a target WiFi hotspot, a frequency band of the target WiFi hotspot being staggered from a frequency band of the initial network resource accessed by the device requesting access; generating a feedback message in response to the hotspot enabling command, the feedback message including hotspot information of the target WiFi hotspot; and sending the feedback message, so that the device requesting access can be connected to the target WiFi hotspot.

An embodiment of the present disclosure further provides an electronic device. The device may include: at least one processor; and a memory in communicative connection with the at least one processor. The memory stores instructions executable by the at least one processor which, when executed by the at least one processor, cause the at least one processor to implement the aforementioned WiFi hotspot management method.

An embodiment of the present disclosure further provides a computer-readable storage medium storing a computer program which, when executed by a processor, causes the processor to implement the aforementioned WiFi hotspot management method.

BRIEF DESCRIPTION OF DRAWINGS

Descriptions will be made for one or more embodiments with reference to the figures in the corresponding accompanying drawings without constituting a limitation to the embodiments.

DETAILED DESCRIPTION

Figure 1:
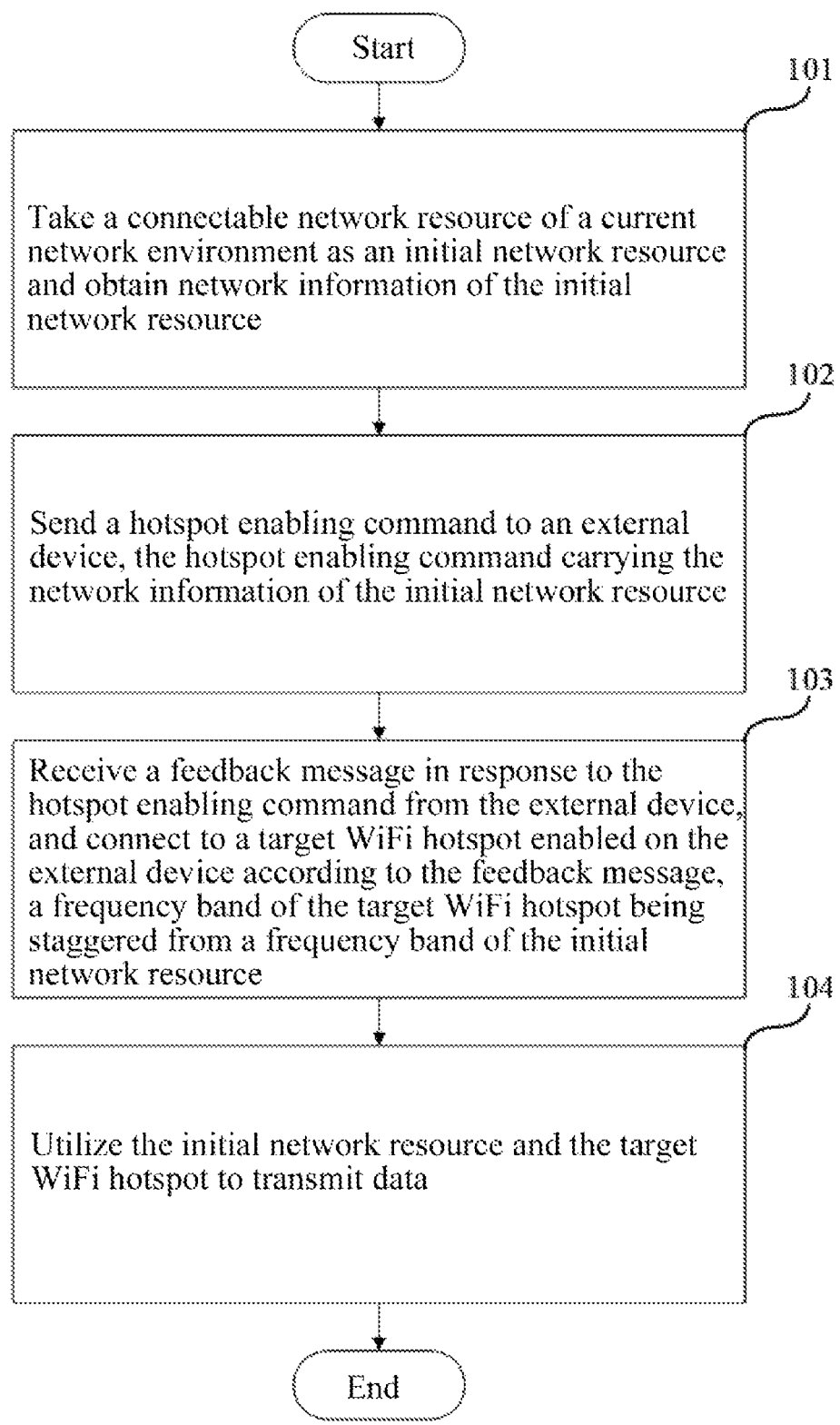
FIG. 1 is a schematic flowchart of a WiFi hotspot management method according to a first embodiment of the present application.

In order to make the object, technical scheme and advantages of the embodiments of the present application clearer, each embodiment of the present application will be set forth in detail hereinafter with reference to the accompanying drawings. However, those having ordinary skill in the art can understand that many technical details are put forward in each embodiment of the present application in order for readers to better understand the present application. However, even without these technical details and various changes and modifications based on the following embodiments, the technical scheme which is required to be protected by the present application can still be implemented.

A multi-link data concurrent transmission acceleration function refers to a function which distributes data into multiple links for transmission when applied in a terminal device such as a mobile phone. From the perspective of an underlying physical device, when the mobile phone distributes the data into the multiple links for transmission, there exists a problem of inter-frequency band interference between different wireless modules in the mobile phone. For example, a Cellular wireless network and WiFi with a 2.4G frequency band (the operating frequency band is 2400 MHz to 2500 MHz) shown in Table 1 will interfere with each other when operating simultaneously. Time Division Duplexing (TDD) n79 (both an uplink operating frequency band and a downlink operating frequency band are 4400 MHz to 5000 MHz) in 5th-Generation (5G) and WiFi with a 5G frequency band (the operating frequency band is 4900 MHz to 5900 MHz) will interfere with each other when operating simultaneously.

TABLE 1

| Cellular wireless network | Uplink Operating Frequency Band/MHz | Downlink Operating Frequency Band/MHz |
| --- | --- | --- |
| LTE FDD band7 | 2500-2700 | 2620-2690 |
| LTE FDD band30 | 2305-2315 | 2350-2360 |
| LTE TDD band38 | 2570-2620 | 2570-2620 |
| LTE TDD band40 | 2300-2400 | 2300-2400 |
| LTE TDD band41 | 2496-2690 | 2496-2690 |
| 5G FDD n7 | 2500-2570 | 2620-2690 |
| 5G TDD n38 | 2570-2620 | 2570-2620 |
| 5G TDD n41 | 2496-2690 | 2496-2690 |

In order to solve the aforementioned problems, a first embodiment of the present disclosure relates to a WiFi hotspot management method. The method includes: taking a connectable network resource of a current network environment as an initial network resource and obtaining network information of the initial network resource; sending a hotspot enabling command to an external device, the hotspot enabling command carrying the network information of the initial network resource; receiving a feedback message in response to the hotspot enabling command from the external device, and connecting to a target WiFi hotspot enabled on the external device according to the feedback message, a frequency band of the target WiFi hotspot being staggered from a frequency band of the initial network resource; and utilizing the initial network resource and the target WiFi hotspot to transmit data. The present embodiment decreases the error rate of data transmission and increases the rate of data transmission when data are distributed into multiple links for transmission. The details of implementation of the WiFi hotspot management method of the present embodiment will be described below. The following contents are merely the details of implementation provided to facilitate understanding, and are not necessary for the implementation of this scheme.

As shown in FIG. 1, the WiFi hotspot management method of the present embodiment includes the following steps of S101 to S104.

At S101, a connectable network resource of a current network environment is taken as an initial network resource and obtaining network information of the initial network resource.

The initial network resource may include a Cellular wireless network currently used by a device (referred to as a device requesting access hereinafter), a connected WiFi hotspot and the like. The network information of the initial network resource may include information such as frequency band information, operator information and network type) of a Cellular wireless network, and information such as frequency band information, service set identifier (SSID) and password of a connected WiFi hotspot.

In the embodiment, if the initial network resource includes a Cellular wireless network, the obtaining network information of the initial network resource at least includes: obtaining frequency band information of the Cellular wireless network; and if the initial network resource includes a connected WiFi hotspot, the obtaining network information of the initial network resource at least includes: obtaining hotspot information of the connected WiFi hotspot.

The obtained frequency band information of the Cellular wireless network is to be provided to an external device, so that the external device can enable a WiFi hotspot with a frequency band staggered from a frequency band of the Cellular wireless network. The obtained WiFi hotspot information is to be provided to the external device, and the WiFi hotspot information at least includes a service set identifier (SSID) and password of the WiFi hotspot, so that the external device can determine the frequency band information of the WiFi hotspot by connecting to the WiFi hotspot, and enable a WiFi hotspot with a frequency band staggered from the frequency band of the WiFi hotspot.

At S102, a hotspot enabling command is sent to an external device, where the hotspot enabling command carries the network information of the initial network resource.

When it is monitored by the device requesting access that there is no WiFi hotspot with a different frequency band available in the current network environment, the device requesting access learns by Global Positioning System (GPS) location sharing that there is an external device nearby, and sends a hotspot enabling command to the external device through Bluetooth, short messaging service or a wireless network. The hotspot enabling command is used to instruct the external device to enable a WiFi hotspot with a specified frequency band, and carries network information of the initial network resource obtained in the previous step.

In an actual application scenario, the connectable network resource of the current network environment for the device requesting access may include the following cases:

Case 1: There is no connectable WiFi hotspot within a connection range of the device requesting access. In this case, the hotspot enabling command sent to the external device may carry frequency band information of the Cellular wireless network accessed by the device requesting access.

Case 2: There are connectable WiFi hotspots within the connection range of the device requesting access, but there is no WiFi hotspot with a frequency band staggered from the frequency band of the Cellular wireless network accessed by the device requesting access among these connectable WiFi hotspots. In this case, the hotspot enabling command sent to the external device may carry at least one of the frequency band information of the Cellular wireless network accessed by the device requesting access and the hotspot information of the WiFi hotspot connectable by the device requesting access.

Case 3: The device requesting access supports WiFi dual connectivity (or is not registered in the Cellular wireless network), but there is no connectable WiFi hotspot with a different frequency band within the connection range. In this case, the hotspot enabling command sent to the external device may carry hotspot information of WiFi hotspots connectable by the device requesting access. The hotspot enabling command may also carry frequency band information of the WiFi hotspots connectable by the device requesting access, so as to avoid the situation that the external device cannot obtain the frequency band information because the external device cannot be connected to these WiFi hotspots.

Case 4: The network quality of a connectable WiFi hotspot within the connection range of the device requesting access is poor, leading to a poor effect of concurrent transmission of data through multiple links. In this case, the hotspot enabling command sent to the external device may carry frequency band information of the Cellular wireless network accessed by the device requesting access.

It is worth mentioning that when the initial network resource connectable by the device requesting access contains operator information of the Cellular wireless network, the operator information may be obtained in the previous step, and the hotspot enabling command carries the operator information of the Cellular wireless network in this step. Since the frequency bands of Cellular wireless networks of different operators are different, by carrying operator information of a Cellular wireless network in the hotspot enabling command, the external device is enabled to select the Cellular wireless networks of the different operators to enable WiFi hotspots with frequency bands staggered from frequency bands of the Cellular wireless networks.

At S103, a feedback message in response to the hotspot enabling command is received from the external device, and a target WiFi hotspot enabled on the external device is connected according to the feedback message, where the frequency band of the target WiFi hotspot is staggered from the frequency band of the initial network resource.

After the external device receives the hotspot enabling command sent by the device requesting access, the WiFi hotspot with the frequency band staggered from the frequency band of the initial network resource connectable by the device requesting access is enabled on the external device according to the network information of the initial network resource accessed by the device requesting access carried by the hotspot enabling command, and the external device generates a feedback message in response to the hotspot enabling command, the feedback message carrying the hotspot information of the enabled WiFi hotspot. The device requesting access receives the feedback message and connects to the WiFi hotspot enabled on the external device based on the WiFi hotspot information carried by the feedback message.

For example, if the hotspot enabling command carries frequency band information of a Cellular wireless network accessed by the device requesting access and the Cellular wireless network is one of the Cellular wireless networks in Table 1, a WiFi hotspot with a 5G frequency band is enabled on the external device. If the hotspot enabling command carries frequency band information of a Cellular wireless network accessed by the device requesting access and the Cellular wireless network is 5G TDD n79, a WiFi hotspot with a 2.4G frequency band is enabled on the external device. If the hotspot enabling command carries hotspot information of a WiFi hotspot to which the device requesting access is connected and a determination is made that the WiFi hotspot is a WiFi hotspot with a frequency band of 2.4 G (or a 5G frequency band) according to the hotspot information, the WiFi hotspot with a 5G frequency band (or a 2.4G frequency band) is enabled.

At 104, the initial network resource and the target WiFi hotspot are utilized to transmit data.

Since the frequency band of the target WiFi hotspot enabled on the external device is staggered from the frequency band of the initial network resource of the device requesting access, after the device requesting access is connected to the target WiFi hotspot, data are concurrently transmitted through multiple links based on the initial network resource and the target WiFi hotspot, thereby avoiding the problem of inter-frequency band interference between data.

In the embodiment, compared with the existing technology, a connectable network resource of a current network environment is taken as an initial network resource and obtaining network information of the initial network resource; a hotspot enabling command is sent to an external device, the hotspot enabling command carrying the network information of the initial network resource; a feedback message in response to the hotspot enabling command is received from the external device, and a target WiFi hotspot enabled on the external device is connected according to the feedback message, the frequency band of the target WiFi hotspot being staggered from the frequency band of the initial network resource; and the initial network resource and the target WiFi hotspot are utilized to transmit data. By controlling the external device to enable the target WiFi hotspot with the frequency band staggered from the frequency band of the initial network resource and utilizing the target WiFi hotspot and the initial network resource to transmit data, since the frequency band of the target WiFi hotspot is staggered from the frequency band of the initial network resource, each wireless module sends and receives data in a different frequency band respectively, and the data transmissions in the different frequency bands will not interfere with each other, thus decreasing the error rate of data transmission and increasing the rate of data transmission.

A second embodiment of the present disclosure relates to a WiFi hotspot management method. The second embodiment is a further improvement of the first embodiment. The improvement lies in that prior to the step of obtaining network information of the initial network resource, the WiFi hotspot management method further includes: detecting network speeds of WiFi hotspots with connection permissions within the connection range, and determining WiFi hotspots with the network speeds less than a preset threshold as invalid WiFi hotspots; and carrying network information of the invalid WiFi hotspots in the hotspot enabling command sent to the external device.

Figure 2:
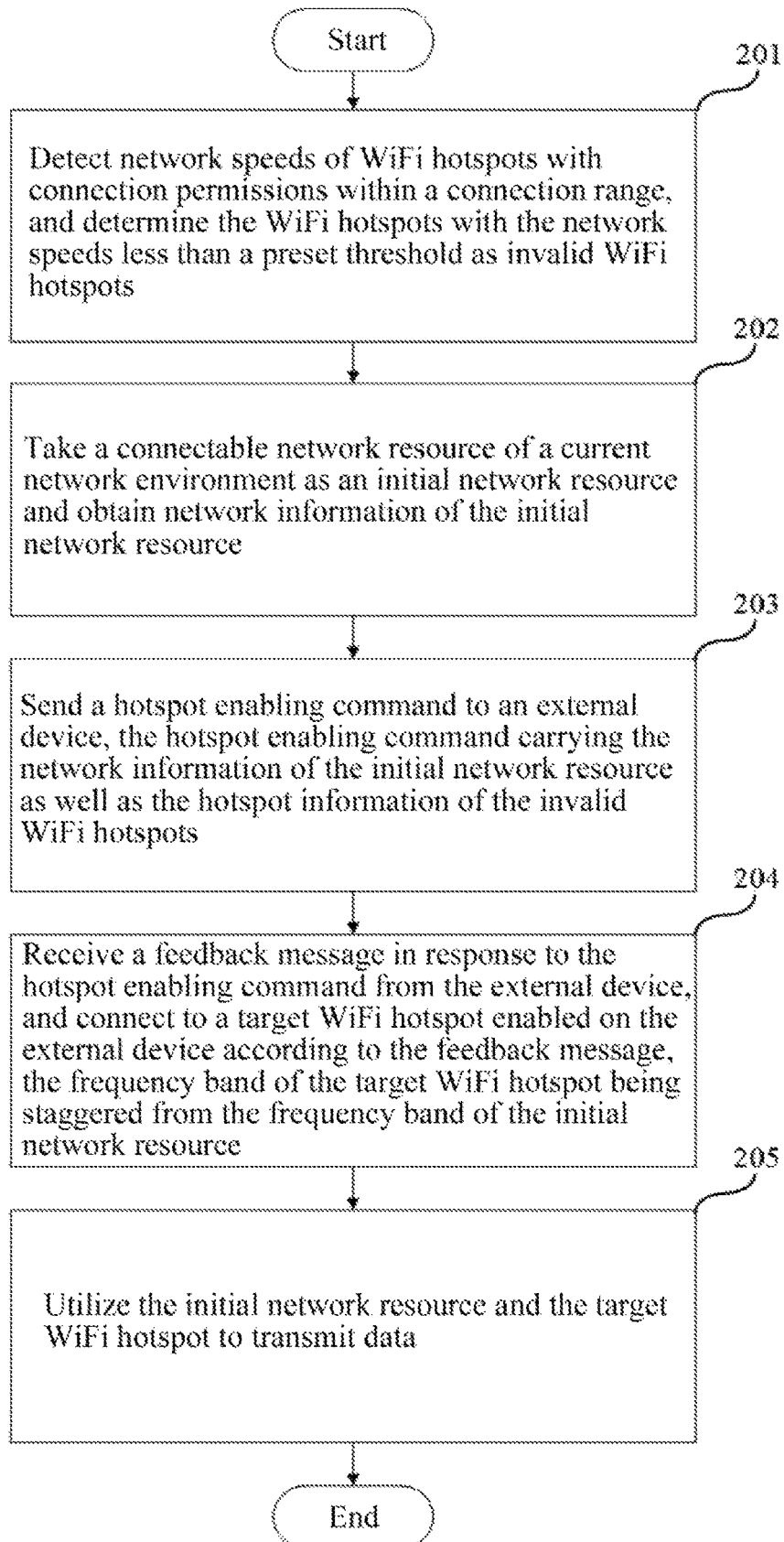
FIG. 2 is a schematic flowchart of a WiFi hotspot management method according to a second embodiment of the present application.

As shown in FIG. 2, the WiFi hotspot management method of the present embodiment includes steps of S201 to S205.

At S201, network speeds of WiFi hotspots with connection permissions within the connection range are detected, and the WiFi hotspots with the network speeds less than a preset threshold are determined as invalid WiFi hotspots.

In order to avoid the situation that the poor network quality of a WiFi hotspot connected by the device requesting access leads to a poor effect of concurrent transmission of data through multiple links, the device requesting access may detect the network speeds of connectable WiFi hotspots in advance, and determine the WiFi hotspots with the network speeds less than the preset threshold as invalid WiFi hotspots, so as to avoid connecting to the invalid WiFi hotspots in subsequent multi-link data concurrent connection.

At S202, a connectable network resource of a current network environment is taken as an initial network resource and obtaining network information of the initial network resource.

The S202 is substantially the same as S101 in the first embodiment, so a detailed description will be omitted to avoid repetition.

At S203, a hotspot enabling command is sent to an external device, where the hotspot enabling command carries the network information of the initial network resource as well as hotspot information of the invalid WiFi hotspots.

The hotspot enabling command carries the hotspot information of the invalid WiFi hotspots (at least including SSIDs of the invalid WiFi hotspots), so that external device can avoid poor network quality provided by an enabled target WiFi hotspot due to connection to a WiFi hotspot with too slow network speed.

At S204, a feedback message in response to the hotspot enabling command is received from the external device, and a target WiFi hotspot enabled on the external device is connected according to the feedback message, where the frequency band of the target WiFi hotspot is staggered from the frequency band of the initial network resource.

At 205, the initial network resource and the target WiFi hotspot are utilized to transmit data.

The steps S204 and S205 are substantially the same as the steps S103 and S104 in the first embodiment respectively, so these steps are not described in detail here to avoid repetition.

Compared with the first embodiment, in the embodiment of the present application, prior to obtaining network information of the initial network resource, the network speeds of WiFi hotspots with connection permissions within the connection range are detected; the WiFi hotspots with network speeds less than the preset threshold are determined as invalid WiFi hotspots; and the hotspot enabling command also carries hotspot information of the invalid WiFi hotspots. Since the hotspot enabling command carries the hotspot information of the WiFi hotspots with the network speeds less than the preset threshold, poor network quality provided by a WiFi hotspot enabled on an external device due to connection of the external device to a WiFi hotspot with too slow network speed is avoided.

A third embodiment of the present application relates to a WiFi hotspot management method, which may be applied to a device (referred to as an external device hereinafter) that provides a WiFi hotspot to the device requesting access in the previous embodiment. The method includes: receiving a hotspot enabling command sent by a device requesting access, the hotspot enabling command carrying network information of an initial network resource accessed by the device requesting access; enabling a target WiFi hotspot, a frequency band of the target WiFi hotspot being staggered from a frequency band of the initial network resource accessed by the device requesting access; generating a feedback message in response to the hotspot enabling command, the feedback message including hotspot information of the target WiFi hotspot; and sending the feedback message, so that the device requesting access can be connected to the target WiFi hotspot.

Figure 3:
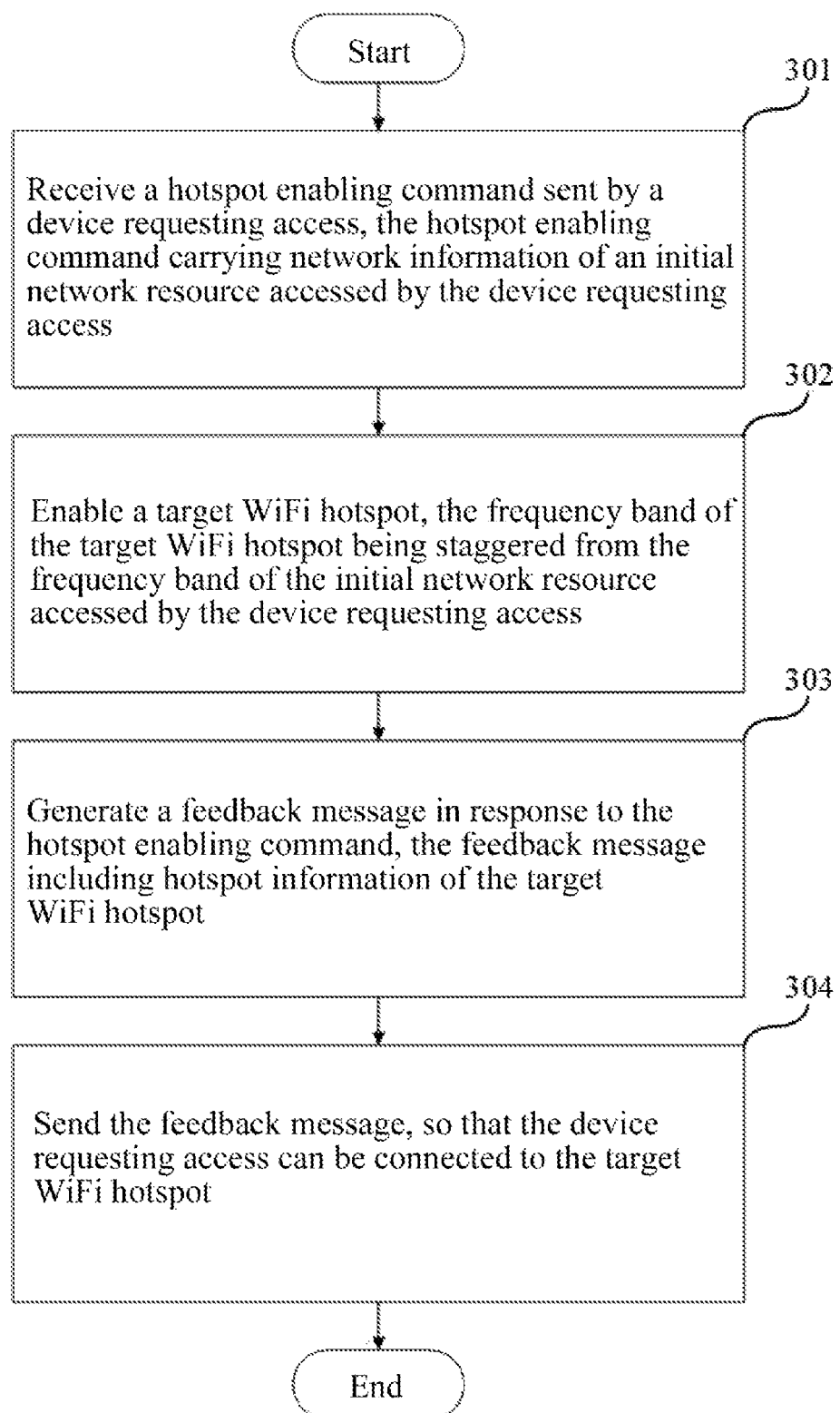
FIG. 3 is a schematic flowchart of a WiFi hotspot management method according to a third embodiment of the present application.

As shown in FIG. 3, the WiFi hotspot management method of the present embodiment includes steps of S301 to S304.

At S301, a hotspot enabling command sent by a device requesting access is received, where the hotspot enabling command carries network information of an initial network resource accessed by the device requesting access.

When it is monitored by a nearby device requesting access that there is no WiFi hotspot with a different frequency band available in the network environment, the device requesting access may sense an external device through GPS location sharing. In this case, the hotspot enabling command sent by the device requesting access, which is used to instruct the external device to enable a WiFi hotspot with a specified frequency band and carries network information of the initial network resource accessed by the device requesting access, is received through Bluetooth, short messaging service (SMS) or a wireless network.

The network information of the initial network resource may include information such as frequency band information, operator information and network type of a Cellular wireless network, and information such as frequency band information, SSID and password of an connected WiFi hotspot.

At S302, a target WiFi hotspot is enabled, where the frequency band of the target WiFi hotspot being staggered from the frequency band of the initial network resource accessed by the device requesting access.

The frequency band of the initial network resource accessed by the device requesting access is obtained first according to the network information of the initial network resource accessed by the device requesting access carried by the hotspot enabling command in the previous step. For example, the frequency band information of the Cellular wireless network accessed by the device requesting access carried by the hotspot enabling command is directly obtained, or the frequency band information of the WiFi hotspot to which the device requesting access is connected is determined according to the hotspot information of the WiFi hotspot to which the device requesting access is connected carried in the hotspot enabling command.

In the present embodiment, after the frequency band of the initial network resource accessed by the device requesting access is obtained, a WiFi hotspot with a frequency band staggered from the frequency band of the initial network resource accessed by the device requesting access is enabled.

For example, if the hotspot enabling command carries frequency band information of a Cellular wireless network accessed by the device requesting access and the Cellular wireless network is one of the Cellular wireless networks in Table 1, a WiFi hotspot with a 5G frequency band is enabled on the external device. If the hotspot enabling command carries frequency band information of a Cellular wireless network accessed by the device requesting access and the Cellular wireless network is 5G TDD n79, a WiFi hotspot with a 2.4G frequency band is enabled on the external device. If the hotspot enabling command carries hotspot information of a WiFi hotspot with a 2.4G frequency band (or a 5G frequency band) to which the device requesting access is connected, the WiFi hotspot with a 5G frequency band (or a 2.4G frequency band) is enabled.

In addition, if the hotspot enabling command also carries operator information of a Cellular wireless network accessed by the device requesting access, prior to enabling the target WiFi hotspot, the Cellular wireless network currently used is switched in advance to a Cellular wireless network whose operator is different from an operator of the Cellular wireless network accessed by the device requesting access. Since the frequency bands of Cellular wireless networks of different operators are different, by choosing the Cellular wireless networks of the different operators, WiFi hotspots with frequency bands staggered from the frequency bands of the Cellular wireless networks can be enabled.

At S303, a feedback message in response to the hotspot enabling command is generated, where the feedback message includes hotspot information of the target WiFi hotspot.

The feedback message generated at least contains an SSID and a password of the target WiFi hotspot.

At S304, the feedback message is sent, so that the device requesting access can be connected to the target WiFi hotspot.

Since the frequency band of the target WiFi hotspot enabled on the external device is staggered from the frequency band of the initial network resource of the device requesting access, after the device requesting access is connected to the target WiFi hotspot, data are concurrently transmitted through multiple links based on the initial network resource and the target WiFi hotspot, thereby avoiding the problem of inter-frequency band interference between data.

In the embodiment of the present application, compared with the existing technology, a hotspot enabling command sent by a device requesting access is received, the hotspot enabling command carrying network information of an initial network resource accessed by the device requesting access; a target WiFi hotspot is enabled, the frequency band of the target WiFi hotspot being staggered from the frequency band of the initial network resource accessed by the device requesting access; a feedback message in response to the hotspot enabling command is generated, the feedback message including hotspot information of the target WiFi hotspot; and the feedback message is sent, so that the device requesting access can be connected to the target WiFi hotspot. By enabling the WiFi hotspot with the frequency band staggered from the frequency band of the initial network resource accessed by the device requesting access and providing the WiFi hotspot to the device requesting access, when the device requesting access utilizes the WiFi hotspot and the initial network resource to transmit data, each wireless module transmits and receives data in a different frequency band respectively, and the data transmissions in the different frequency bands will not interfere with each other, thus decreasing the error rate of data transmission and increasing the rate of data transmission.

It is worth mentioning that prior to S302 (i.e., the enabling a target WiFi hotspot) is executed, the external device may detect available network resources and select a network connection with the best network quality as a shared network before enabling a target WiFi hotspot. More specifically, the external device may detect signal strengths of connectable WiFi hotspots in the connection range, judge which of the WiFi hotspot with the highest signal strength and a Cellular wireless network currently used by the external device has the best network quality and select the one with the better network quality as a shared network in advance before enabling a target WiFi hotspot.

A fourth embodiment of the present disclosure relates to a WiFi hotspot management method. The fourth embodiment is substantially the same as the third embodiment, except that in the present embodiment, a hotspot enabling command received carries frequency band information of a Cellular wireless network accessed by the device requesting access and hotspot information of a WiFi hotspot to which the device requesting access is connected; and that prior to enabling a target WiFi hotspot, the method further includes: connecting to the WiFi hotspot to which the device requesting access is connected according to the hotspot information of the WiFi hotspot to which the device requesting access is connected.

Figure 4:
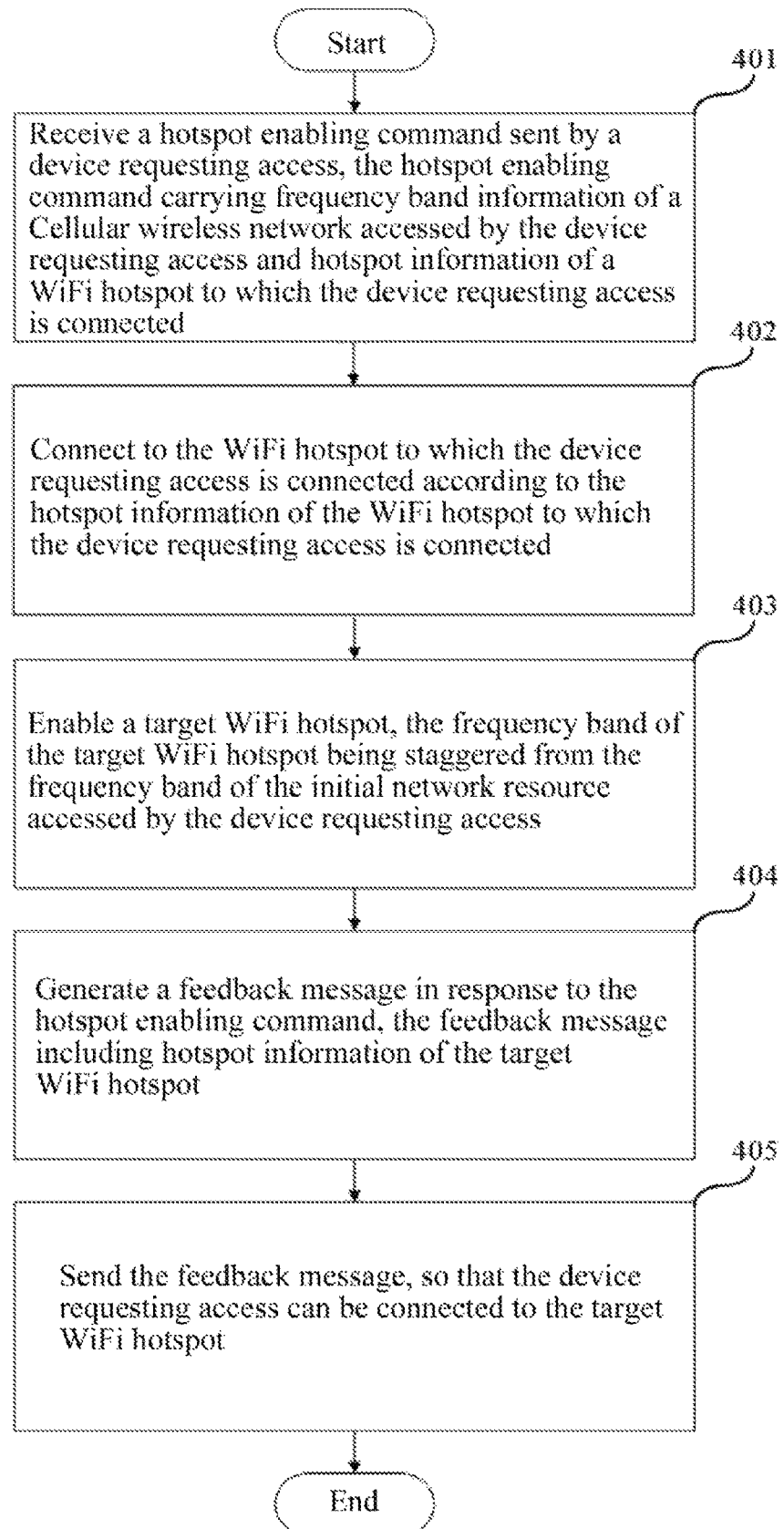
FIG. 4 is a schematic flowchart of a WiFi hotspot management method according to a fourth embodiment of the present application.

As shown in FIG. 4, the WiFi hotspot management method of the present embodiment includes steps of S401 to S405.

At S401, a hotspot enabling command sent by a device requesting access is received, the hotspot enabling command carrying frequency band information of a Cellular wireless network accessed by the device requesting access and hotspot information of a WiFi hotspot to which the device requesting access is connected.

Since the hotspot enabling command carries the frequency band information of the Cellular wireless network accessed by the device requesting access and the hotspot information of the WiFi hotspot to which the device requesting access is connected, it indicates that in this case, there are accessible WiFi hotspots within the connection range of the device requesting access, but there is no WiFi hotspot with a frequency band staggered from the frequency band of the Cellular wireless network accessed by the device requesting access among these connectable WiFi hotspots.

At S402, a connection is made to the WiFi hotspot to which the device requesting access is connected according to the hotspot information of the WiFi hotspot to which the device requesting access is connected.

The external device is connected to the WiFi hotspot according to the hotspot information of the WiFi hotspot to which the device requesting access is connected provided in the hotspot enabling command, and uses the WiFi hotspot as a shared network to enable a target WiFi hotspot.

At S403, a target WiFi hotspot is enabled, where the frequency band of the target WiFi hotspot is staggered from the frequency band of the initial network resource accessed by the device requesting access.

For example, if the WiFi hotspot connected according to the hotspot enabling command in the previous step is a WiFi hotspot with a 2.4G frequency band, a target WiFi hotspot with a 5G frequency band is enabled; and if the WiFi hotspot connected in the previous step is a WiFi hotspot with the 5G frequency band, a target WiFi hotspot with the 2.4G frequency band is enabled.

At S404, a feedback message in response to the hotspot enabling command is generated, where the feedback message includes hotspot information of the target WiFi hotspot.

The S404 is substantially the same as S303 in the third embodiment, so this step will not be described in detail here to avoid repetition.

At 405, the feedback message is sent, so that the device requesting access can be connected to the target WiFi hotspot.

After the feedback message is sent to the device requesting access, the device requesting access is disconnected from the connected WiFi hotspot, and then is connected to the target WiFi hotspot according to the hotspot information provided by the feedback message, and the Cellular wireless network and the target WiFi hotspot are used to transmit data.

It is worth mentioning that in the present embodiment, the external device is not required to be registered in the Cellular wireless network.

In the present embodiment, compared with the third embodiment, in view of the case of "there are connectable WiFi hotspots within the connection range of the device requesting access, but there is no WiFi hotspot with a frequency band staggered from the frequency band of the Cellular wireless network accessed by the device requesting access among these connectable WiFi hotspots", a connection is made to the WiFi hotspot to which the device requesting access is connected, and a target WiFi hotspot with a frequency band staggered from the frequency band of the Cellular wireless network accessed by the device requesting access is enabled. By converting the frequency band of the WiFi hotspot to which the device requesting access is connected, the device requesting access can use the Cellular wireless network and a WiFi hotspot after frequency band conversion to transmit data.

A fifth embodiment of the present disclosure relates to a WiFi hotspot management method. The fifth embodiment is substantially the same as the third embodiment, except that in the present embodiment, a hotspot enabling command received carries hotspot information of a WiFi hotspot to which the device requesting access is connected, but does not carry frequency band information of a Cellular wireless network accessed by the device requesting access; and that prior to enabling a target WiFi hotspot, the method further includes: connecting to a WiFi hotspot with connection permission, other than the WiFi hotspot to which the device requesting access is connected, in the connection range.

Figure 5:
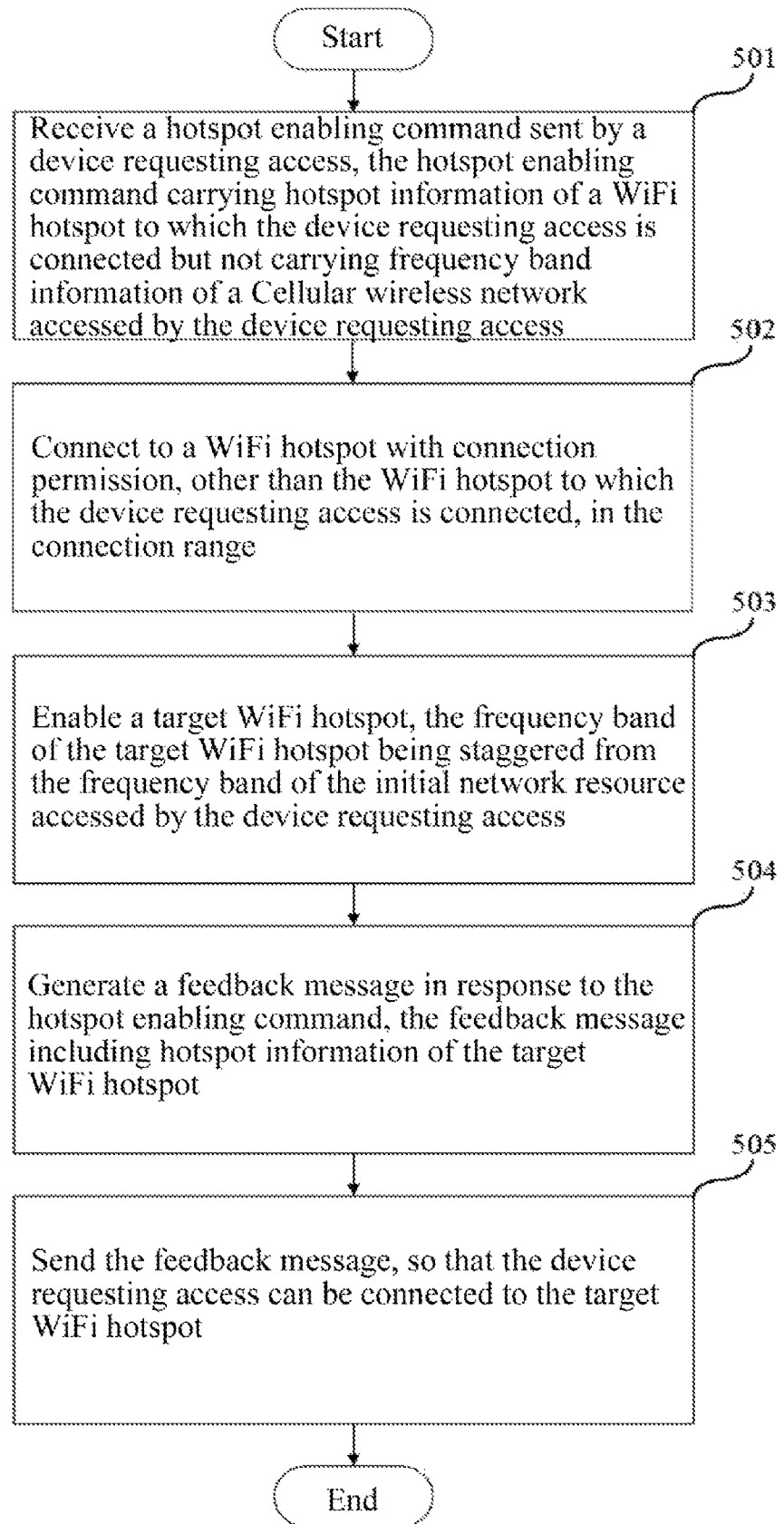
FIG. 5 is a schematic flowchart of a WiFi hotspot management method according to a fifth embodiment of the present application.

As shown in FIG. 5, the WiFi hotspot management method of the present embodiment includes steps of S501 to S505.

At S501, a hotspot enabling command sent by a device requesting access is received, where the hotspot enabling command carries hotspot information of a WiFi hotspot to which the device requesting access is connected but does not carry frequency band information of a Cellular wireless network accessed by the device requesting access.

Since the hotspot enabling command carries the hotspot information of the WiFi hotspot to which the device requesting access is connected but does not carry the frequency band information of the Cellular wireless network accessed by the device requesting access, it indicates that in this case, the device requesting access supports WiFi dual connectivity (or is not registered in the Cellular wireless network), but there is no connectable WiFi hotspot with a different frequency band within the connection range.

At S502, a connection is made to a WiFi hotspot with connection permission, other than the WiFi hotspot to which the device requesting access is connected, in the connection range.

In the present embodiment, the external device takes the connection with a WiFi hotspot as a shared network, and in the selection of a WiFi hotspot to be connected, the WiFi hotspot to which the device requesting access is connected is avoided. In a specific application scenario, the external device may also use a Cellular wireless network as a shared network.

At S503, a target WiFi hotspot is enabled, where the frequency band of the target WiFi hotspot is staggered from the frequency band of the initial network resource accessed by the device requesting access.

At S504, a feedback message in response to the hotspot enabling command is generated, where the feedback message includes hotspot information of the target WiFi hotspot.

The steps S503 and S504 are substantially the same as the steps S302 and S303 in the third embodiment, so these step will not be described in detail here to avoid repetition.

At S505, the feedback message is sent, so that the device requesting access can be connected to the target WiFi hotspot.

After the feedback message is sent to the device requesting access, the device requesting access is connected to the target WiFi hotspot according to the hotspot information provided by the feedback message, and uses the initially accessed WiFi hotspot and the target WiFi hotspot to transmit data.

In the present embodiment, compared with the third embodiment, in view of the case of "the device requesting access supports WiFi dual connectivity (or is not registered in the Cellular wireless network), but there is no connectable WiFi hotspot with a different frequency band within the connection range", a connection is made to a WiFi hotspot other than the WiFi hotspot to which the device requesting access is connected and the target WiFi hotspot with the frequency band staggered from the frequency band of the WiFi hotspot to which the device requesting access is connected is enabled. By connecting to the WiFi hotspot other than the WiFi hotspot to which the device requesting access is connected, the situation that the effect of accelerating the concurrent transmission of data in multiple links by the device requesting access becomes poor due to the connected WiFi hotspot and the WiFi hotspot to which the device requesting access is connected being the same WiFi hotspot can be avoided.

A sixth embodiment of the present disclosure relates to a WiFi hotspot management method. The sixth embodiment is substantially the same as the third embodiment, except that in the present embodiment, a hotspot enabling command received carries frequency band information of a Cellular wireless network accessed by the device requesting access and hotspot information of invalid WiFi hotspots; and that prior to enabling a target WiFi hotspot, the method further includes: connecting to a WiFi hotspot with connection permission, other than the invalid WiFi hotspots, in the connection range.

Figure 6:
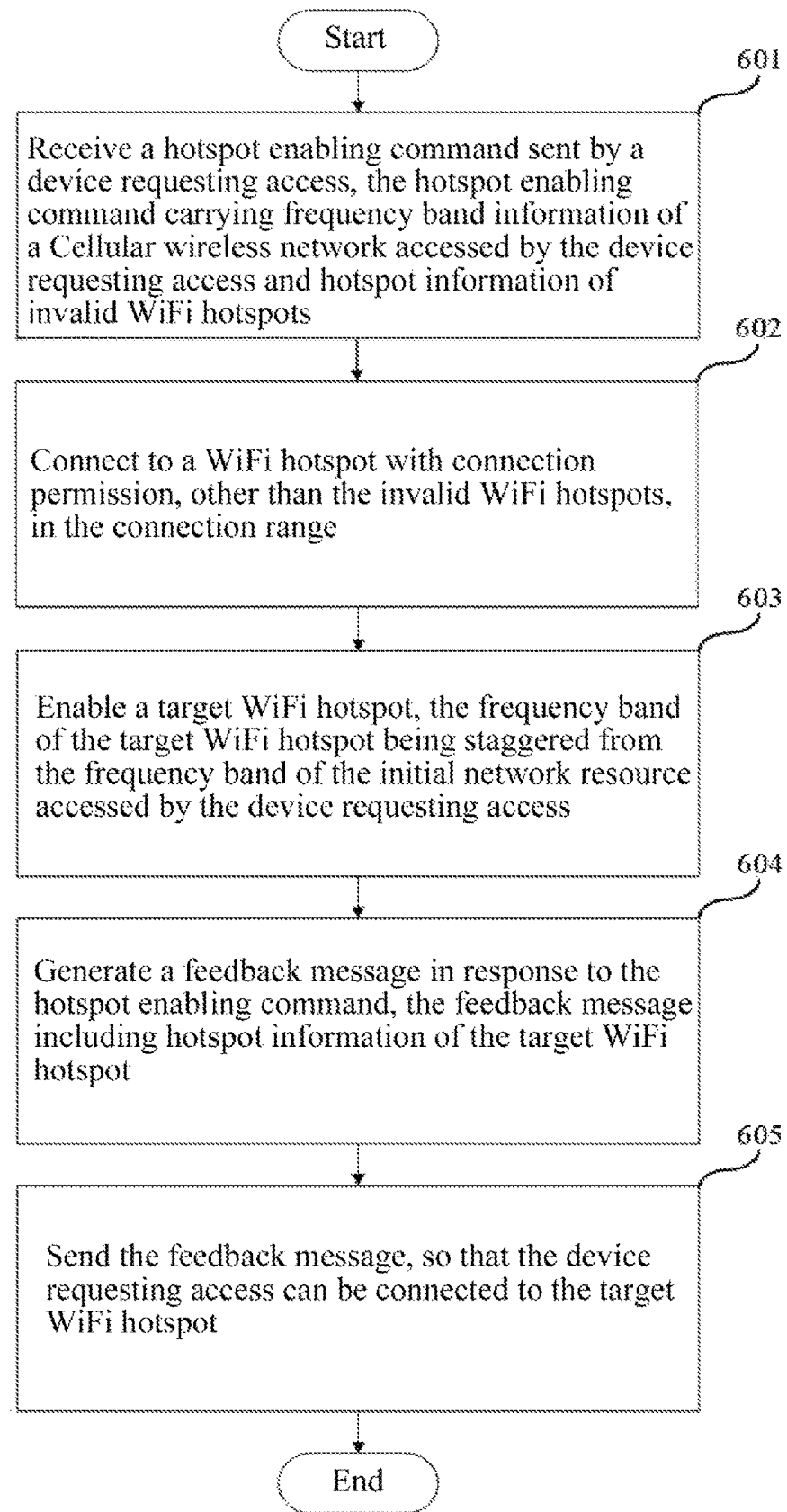
FIG. 6 is a schematic flowchart of a WiFi hotspot management method according to a sixth embodiment of the present application.

As shown in FIG. 6, the WiFi hotspot management method of the present embodiment includes steps of S601 to S605.

At S601, a hotspot enabling command sent by a device requesting access is received, where the hotspot enabling command carries frequency band information of a Cellular wireless network accessed by the device requesting access and hotspot information of invalid WiFi hotspots.

Since the hotspot enabling command carries the frequency band information of the Cellular wireless network accessed by the device requesting access and the hotspot information of the invalid WiFi hotspots, it indicates that in this case, the network quality of the connectable WiFi hotspots within the connection range of the device requesting access is poor, resulting in poor effect of concurrent transmission of data in multiple links.

At S602, a connection is made to a WiFi hotspot with connection permission, other than the invalid WiFi hotspots, in the connection range.

In the present embodiment, the external device takes the connection with a WiFi hotspot as a shared network, and in the selection of a WiFi hotspot to be connected, the invalid WiFi hotspots are avoided. In a specific application scenario, the external device may also use a Cellular wireless network as a shared network.

In the present embodiment, in this step, the external device selects a network connection with the best network quality among connectable network resources as a shared network in advance before enabling a target WiFi hotspot. More specifically, the external device can detect signal strengths of connectable WiFi hotspots within the connection range in advance, and connects to the WiFi hotspot with the highest signal strength, to enable a target WiFi hotspot.

At S603, a target WiFi hotspot is enabled, where the frequency band of the target WiFi hotspot is staggered from the frequency band of the initial network resource accessed by the device requesting access.

At S604, a feedback message in response to the hotspot enabling command is generated, where the feedback message includes hotspot information of the target WiFi hotspot.

The steps S603 and S604 are substantially the same as the steps S302 and S303 in the third embodiment, so these steps will not be described in detail here to avoid repetition.

At S605, the feedback message is sent, so that the device requesting access can be connected to the target WiFi hotspot.

After the feedback message is sent to the device requesting access, the device requesting access is connected to the target WiFi hotspot according to the hotspot information provided by the feedback message, and uses the initially connected WiFi hotspot and the target WiFi hotspot to transmit data.

In the present embodiment, compared with the third embodiment, in view of the case of "the network quality of the connectable WiFi hotspots within the connection range of the device requesting access is poor, resulting in poor effect of concurrent transmission of data in multiple links", a connection is made to a WiFi hotspot, other than the invalid WiFi hotspots, and the target WiFi hotspot with the frequency band staggered from the frequency band of the WiFi hotspot to which the device requesting access is connected is enabled. By connecting to the WiFi hotspot, other than the invalid WiFi hotspots, carried by the hotspot enabling command, the situation that the network quality provided by an enabled WiFi hotspot is poor due to connection to a WiFi hotspot with too slow network speed is avoided.

Dividing the above various methods into the steps is merely to make the description clear, and during implementation, the steps can be combined into one step or certain steps can be divided, decomposed into a plurality of steps, both of which fall into the protection scope of the present patent as long as the same logic relation is contained. The addition of inessential modifications or the introduction of inessential designs into the algorithm or the flow which does not change the core designs of the algorithm and the flow all falls into the protection scope of the present patent.

Figure 7:
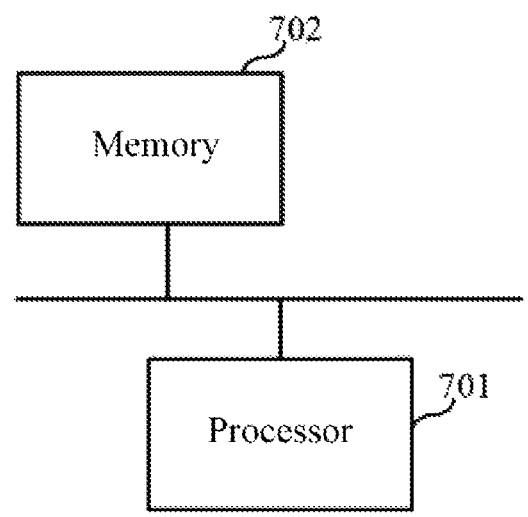
FIG. 7 is a schematic structural diagram of an electronic device according to a seventh embodiment of the present application.

A seventh embodiment of the present disclosure relates to an electronic device. As shown in FIG. 7, the electronic device includes: at least one processor 701; and a memory 702 in communicative connection with the at least one processor 701. The memory 702 stores instructions executable by the at least one processor 701 which, when executed by the at least one processor 701, cause the at least one processor 701 to implement the WiFi hotspot management method in any of the aforementioned method embodiments.

The memory 702 and the processor 701 are connected via a bus. The bus may include any number of interconnected buses and bridges. The bus connects various circuits of the one or more processors 701 and the memory 702 together. The bus may also connect various other circuits such as a peripheral device, a voltage regulator, a power management circuit, etc., which are well-known in the art and therefore will not be further described herein. A bus interface provides an interface between the bus and a transceiver. The transceiver may be one component or multiple components (such as multiple receivers and transmitters), providing a unit for communicating with various other apparatuses on a transmission medium. Data processed by the processor 701 is transmitted on a wireless medium through an antenna. In the present embodiment, the antenna also receives data and transmits the data to the processor 701.

The processor 701 is configured for managing the bus and conventional processing, and may also provide various functions, including timing, peripheral interfaces, voltage regulation, power management and other control functions. The memory 702 may be configured to store data which is used by the processor 701 when performing operations.

According to an embodiment of the present disclosure, further provided is a computer-readable storage medium storing a computer program which, when executed by a processor, causes the processor to implement the WiFi hotspot management method in any of the aforementioned method embodiments.

That is, those having ordinary skill in the art may understand that all or part of the steps in the methods for implementing the above embodiments may be carried out by related hardware instructed by a program. The program is stored in a storage medium and includes a plurality of instructions to make a device (such as a single chip, a chip or the like) or a processor execute all or part of the steps of the method described in each embodiment of the present application. The aforementioned storage medium includes: a USB flash disk, a mobile hard disk, a read-only memory (ROM), a random access memory (RAM), a magnetic disk, an optical disk, or various other media capable of storing program codes.

Those having ordinary skill in the art should understand that the aforementioned embodiments are the specific embodiments implementing the present application. However, in practical application, various changes can be made to the embodiments in terms of forms and details without departing from the protection scope of the present application.

What is claimed is:

1. A WiFi hotspot management method, comprising:
taking, by a user device, a connectable network resource of a current network environment as an initial network resource, and obtaining, by the user device, network information of the initial network resource, wherein the network information of the initial network resource comprises a frequency band of the initial network resource;
sending, by the user device, a hotspot enabling command to an external device, the hotspot enabling command carrying the network information of the initial network resource, wherein the hotspot enabling command is used to instruct the external device to determine a target WiFi hotspot from WiFi hotspots based on the network information of the initial network resource and to enable the target WiFi hotspot;
receiving, by the user device, a feedback message in response to the hotspot enabling command from the external device, and connecting to the target WiFi hotspot enabled on the external device according to the feedback message, a frequency band of the target WiFi hotspot being staggered from the frequency band of the initial network resource; and
utilizing, by the user device, the initial network resource and the target WiFi hotspot enabled on the external device to transmit data.

2. The WiFi hotspot management method of claim 1, wherein in response to the initial network resource comprising a Cellular wireless network, obtaining, by the user device, network information of the initial network resource comprises:
obtaining, by the user device, frequency band information of the Cellular wireless network; and in response to the initial network resource comprising a connected WiFi hotspot, obtaining, by the user device, network information of the initial network resource comprises:
  obtaining, by the user device, hotspot information of the connected WiFi hotspot.

3. The WiFi hotspot management method of claim 2, wherein after obtaining, by the user device, frequency band information of the Cellular wireless network, the method further comprises:
  obtaining, by the user device, operator information of the Cellular wireless network; and
  the hotspot enabling command further carrying operator information of the Cellular wireless network.

4. The WiFi hotspot management method of claim 2, wherein after obtaining, by the user device, hotspot information of the connected WiFi hotspot, the method further comprises:
  obtaining, by the user device, frequency band information of the connected WiFi hotspot; and
  the hotspot enabling command further carrying the frequency band information of the connected WiFi hotspot.

5. The WiFi hotspot management method of claim 1, wherein prior to obtaining, by the user device, network information of the initial network resource, the method further comprises:
  detecting, by the user device, network speeds of WiFi hotspots with connection permissions within a connection range;
  determining, by the user device, WiFi hotspots with the network speeds less than a preset threshold as invalid WiFi hotspots; and
  the hotspot enabling command further carrying hotspot information of the invalid WiFi hotspots.

6. A WiFi hotspot management method, comprising:
  receiving, by an external device, a hotspot enabling command sent by a user device requesting access, the hotspot enabling command carrying network information of an initial network resource accessed by the user device requesting access, wherein the network information of the initial network resource comprises a frequency band of the initial network resource, the hotspot enabling command is used to instruct the external device to determine a target WiFi hotspot from WiFi hotspots based on the network information of the initial network resource and to enable the target WiFi hotspot;
  enabling, by the external device, the target WiFi hotspot, a frequency band of the target WiFi hotspot being staggered from the frequency band of the initial network resource accessed by the user device requesting access;
  generating, by the external device, a feedback message in response to the hotspot enabling command, the feedback message including hotspot information of the target WiFi hotspot enabled on the external device; and
  sending, by the external device, the feedback message, so that the user device requesting access can be connected to the target WiFi hotspot enabled on the external device.

7. The WiFi hotspot management method of claim 6, wherein in response to the hotspot enabling command carrying frequency band information of a Cellular wireless network accessed by the user device requesting access and hotspot information of a WiFi hotspot to which the user device requesting access is connected, prior to enabling, by the external device, a target WiFi hotspot, the method further comprises:
  connecting to the WiFi hotspot to which the user device requesting access is connected according to the hotspot information of the WiFi hotspot to which the user device requesting access is connected.

8. The WiFi hotspot management method of claim 6, wherein in response to the hotspot enabling command carrying hotspot information of a WiFi hotspot to which the user device requesting access is connected but not carrying frequency band information of a Cellular wireless network accessed by the user device requesting access, prior to enabling, by the external device, a target WiFi hotspot, the method further comprises:
  connecting to a WiFi hotspot with connection permission, other than the WiFi hotspot to which the user device requesting access is connected, in a connection range.

9. The WiFi hotspot management method of claim 6, wherein in response to the hotspot enabling command carrying frequency band information of a Cellular wireless network accessed by the user device requesting access and hotspot information of invalid WiFi hotspots, prior to enabling, by the external device, a target WiFi hotspot, the method further comprises:
  connecting to a WiFi hotspot with connection permission, other than the invalid WiFi hotspots, in the connection range.

10. The WiFi hotspot management method of claim 6, wherein in response to the hotspot enabling command carrying operator information of a Cellular wireless network accessed by the user device requesting access, prior to enabling, by the external device, a target WiFi hotspot, the method further comprises:
  switching, by the external device, to a Cellular wireless network whose operator is different from an operator of the Cellular wireless network accessed by the user device requesting access.

11. A non-transitory computer-readable storage medium, storing a computer program which, when executed by a processor, causes the processor to carry out a WiFi hotspot management method, comprising:
  taking, by a user device, a connectable network resource of a current network environment as an initial network resource, and obtaining, by the user device, network information of the initial network resource, wherein the network information of the initial network resource comprises a frequency band of the initial network resource;
  sending, by the user device, a hotspot enabling command to an external device, the hotspot enabling command carrying the network information of the initial network resource, wherein the hotspot enabling command is used to instruct the external device to determine a target WiFi hotspot from WiFi hotspots based on the network information of the initial network resource and to enable the target WiFi hotspot;
  receiving, by the user device, a feedback message in response to the hotspot enabling command from the external device, and connecting to the target WiFi hotspot enabled on the external device according to the feedback message, a frequency band of the target WiFi hotspot being staggered from the frequency band of the initial network resource; and
  utilizing, by the user device, the initial network resource and the target WiFi hotspot enabled on the external device to transmit data; or to carry out a WiFi hotspot management method, comprising:

receiving, by an external device, a hotspot enabling command sent by a user device requesting access, the hotspot enabling command carrying network information of an initial network resource accessed by the user device requesting access, wherein the network information of the initial network resource comprises a frequency band of the initial network resource, the hotspot enabling command is used to instruct the external device to determine a target WiFi hotspot from WiFi hotspots based on the network information of the initial network resource and to enable the target WiFi hotspot;

enabling, by the external device, the target WiFi hotspot, a frequency band of the target WiFi hotspot being staggered from the frequency band of the initial network resource accessed by the user device requesting access;

generating, by the external device, a feedback message in response to the hotspot enabling command, the feedback message including hotspot information of the target WiFi hotspot enabled on the external device; and sending, by the external device, the feedback message, so that the user device requesting access can be connected to the target WiFi hotspot enabled on the external device.

* * * * *